(12) United States Patent
Sundberg et al.

(10) Patent No.: US 10,107,606 B2
(45) Date of Patent: Oct. 23, 2018

(54) DEVICE FOR DETERMINING THE VELOCITY OF A BULLET

(71) Applicant: STEINERT SENSING SYSTEMS AS, Oslo (NO)

(72) Inventors: Mikael Sundberg, Stockholm (SE); Jonas Genchel, Stockholm (SE)

(73) Assignee: STEINERT SENSING SYSTEMS AS, Oslo (NO)

( * ) Notice: Subject to any disclaimer, the term of this patent is extended or adjusted under 35 U.S.C. 154(b) by 302 days.

(21) Appl. No.: 14/648,673

(22) PCT Filed: Nov. 29, 2012

(86) PCT No.: PCT/EP2012/073958
§ 371 (c)(1),
(2) Date: May 29, 2015

(87) PCT Pub. No.: WO2014/082670
PCT Pub. Date: Jun. 5, 2014

(65) Prior Publication Data
US 2015/0316644 A1   Nov. 5, 2015

(51) Int. Cl.
*G01S 11/14* (2006.01)
*F42B 35/00* (2006.01)
*F41G 1/01* (2006.01)

(52) U.S. Cl.
CPC .............. *F42B 35/00* (2013.01); *G01S 11/14* (2013.01); *F41G 1/01* (2013.01)

(58) Field of Classification Search
CPC ............. G01S 11/14; F41G 1/01; F42B 35/00
(Continued)

(56) References Cited

U.S. PATENT DOCUMENTS 4,030,097 A * 6/1977 Gedeon .................. F41G 3/12
                                                                342/115
4,574,238 A * 3/1986 Weinlich ................ G01P 3/685
                                                                250/222.1
(Continued)

FOREIGN PATENT DOCUMENTS

CH          222834 A     8/1942
DE       2836097 A1     2/1980
(Continued)

OTHER PUBLICATIONS

International Search Report dated Aug. 23, 2013 of PCT/EP2012/073958 which is the parent application—5 pages.
(Continued)

*Primary Examiner* — Isam A Alsomiri
*Assistant Examiner* — Amie Mercedes N'Dure
(74) *Attorney, Agent, or Firm* — Knobbe Martens Olson and Bear, LLP

(57) ABSTRACT

A device determines velocity of a bullet. The device includes two electro-acoustic sensors arranged with a predetermined distance for determining velocity of a bullet. Each of the electro-acoustic sensors are configured to detect acoustic energy of a shock wave generated by the bullet travelling at supersonic speed from a point of fire to a target and configured to transduce the acoustic energy into an electrical signal. The device includes a processing unit configured to receive electrical signals from the electro-acoustic sensors as the bullet travels and to determine a time frame between the two second electrical signals. The velocity of the bullet can be determined based on the time frame. The device also includes a sighting unit attached to a housing of the device for aligning the electro-acoustic sensors parallel to the direction from the point of fire to the target.

15 Claims, 3 Drawing Sheets

(58) Field of Classification Search
USPC .......................................................... 367/127
See application file for complete search history.

(56) References Cited

U.S. PATENT DOCUMENTS

| | | | | |
|---|---|---|---|---|
| 6,019,614 A | * | 2/2000 | Baur | H05K 9/0039 439/883 |
| 6,020,594 A | * | 2/2000 | Tschudi | G01P 3/685 250/221 |
| 2006/0274300 A1 | * | 12/2006 | Hinchliff | A01M 31/002 356/5.02 |
| 2010/0101445 A1 | * | 4/2010 | Garg | F41A 9/65 102/502 |
| 2012/0116548 A1 | * | 5/2012 | Goree | A61B 5/1118 700/90 |
| 2012/0176237 A1 | * | 7/2012 | Tabe | A61B 5/6804 340/539.12 |
| 2012/0266772 A1 | * | 10/2012 | Eckstein | F42B 12/60 102/439 |
| 2012/0266773 A1 | * | 10/2012 | Eckstein | F42B 5/03 102/506 |
| 2013/0047485 A1 | * | 2/2013 | Tubb | F41G 1/38 42/122 |
| 2015/0247703 A1 | * | 9/2015 | Teetzel | F41G 3/065 356/5.01 |

FOREIGN PATENT DOCUMENTS

| | | | | |
|---|---|---|---|---|
| DE | 4106040 A1 | * | 8/1992 | ................. F41J 5/06 |
| EP | 0023365 A2 | | 2/1981 | |
| EP | 0530476 A1 | * | 3/1993 | ........... G01S 3/8083 |
| FR | 2634895 A1 | | 2/1990 | |

OTHER PUBLICATIONS

Written Opinion dated Aug. 23, 2013 of PCT/EP2012/073958 which is the parent application—6 pages.

* cited by examiner

DEVICE FOR DETERMINING THE VELOCITY OF A BULLET

TECHNICAL FIELD

Device for determining the velocity of a bullet travelling in a direction from a point of fire to a target.

TECHNICAL BACKGROUND

A supersonic bullet generates a conically shaped expanding shock wave called a Mach-cone where the local and temporal air turbulence effects can be characterized by a steep change in ambient air pressure (shock front) which expands radially outward from the bullet path. The acoustic energy of the shock front can be detected by acoustic sensors.

There are several techniques to measure the velocity of bullets. Prior art chronograph solutions known to be used at shooting ranges are based on optical sensor technology. However use of acoustic sensors for measuring the velocity of bullets is also mentioned in the state of the art.

U.S. Pat. No. 5,349,853 discloses bullet sensors that measure the time when a bullet passes the monitored plane of the sensors cooperating with a device for calculating a velocity based on these measurements.

WO9805971 discloses a targeting apparatus comprising a plug-together sensor array and a base station for display and analysis. A projectile target is surrounded with a sensor array. The base station receives projectile impact data and displays information corresponding to the data.

A problem with known solutions is that they require set-up of plug in sensors along the shooting range, thus requiring substantial preparation prior to shooting. The present invention seeks to provide an improved device for measuring the velocity of a bullet.

SUMMARY OF INVENTION

The present invention relates to a device for determining the velocity of a bullet travelling in a direction from a point of fire to a target. The device comprises first and second electro-acoustic sensors arranged at a predetermined distance from each other, a processing unit arranged to receive a first electrical signal from the first electro-acoustic sensor and a second electrical signal from the second electro-acoustic sensor to determine a time frame between the reception of the first and second electrical signals and to determine the velocity of the bullet in a direction parallel to the alignment of the first and second electro-acoustic sensors, whereupon the velocity of the bullet in a direction parallel to the alignment of the first and second electro-acoustic sensors is determined, and velocity presentation means.

The first and second electro-acoustic sensors, the processing unit and the velocity presentation means are mounted in a common housing, the housing being formed so that said device for determining the velocity of the bullet is portable. A sighting means is attached to the housing for aligning the first and second electro-acoustic sensors parallel to the direction from the point of fire to the target. Each of the first and second electro-acoustic sensors is arranged to detect acoustic energy in the ultrasonic range of a shock wave generated by the bullet when travelling at supersonic speed in the direction from the point of fire to the target and to transduce the acoustic energy in the ultrasonic range into an electrical signal.

An advantage of detecting acoustic energy of a shock wave is that the shock wave has an abrupt, nearly discontinuous change in the characteristics of the air with an extremely rapid rise in pressure which makes it suitable for precise measurements. An advantage of detecting acoustic energy in the ultrasonic range is that ambient noise within the audible range is neglected. Another advantage is that the response time for electro-acoustic sensors is shorter in the ultrasonic range compared to the response time in the audible range. An effect is that the sighting means provides a high accuracy of measurement with only two electro-acoustic sensors without the need for further electro-acoustic sensors to determine an angle of incidence of the bullet in relation with the electro-acoustic sensors. Some advantages of mounting the first and second electro-acoustic sensors, the processing unit and the velocity presentation means in a common housing are that the device is comprised in an integrated unit, the device is easy to carry by hand, and the device does not need to be put together before use.

According to one aspect of the invention the first and second electro-acoustic sensors are alternatingly activated and deactivated, such that before detecting acoustic energy in the ultrasonic range the first electro-acoustic sensor is activated and after detecting acoustic energy in the ultrasonic range at the first electro-acoustic sensor only the second electro-acoustic sensor is activated. An advantage is that the risk for detecting different parts of a shock wave at the first and second electro-acoustic sensors or detecting ambient noise decreases.

According to a further aspect of the invention the device further comprises at least a further electro-acoustic sensor arranged in alignment with the first and second electro-acoustic sensors. An advantage is that comparisons can be made between determined bullet speeds using different electro-acoustic sensors in order to determine the accuracy of the measurement.

According to a yet a further aspect of the invention the device further comprises at least a further electro-acoustic sensor which is arranged in a direction orthogonal to the alignment of the first and second electro-acoustic sensors. An effect is that it is easier to determine an angle of incidence of the bullet in relation with the electro-acoustic sensors in order to accomplish higher accuracy of the measurement.

According to another aspect of the invention the first and second electro-acoustic sensors are arranged to detect ultrasound in the range of 20 kHz to 20 MHz. An advantage is that ambient noise in the audible range is neglected. Another advantage is that the response time for electro-acoustic sensors is shorter in the ultrasonic range compared to the response time in the audible range.

According to a further aspect of the invention the first and second electro-acoustic sensors have a response time shorter than 5 µs. An effect is that higher accuracy of the measurement is achieved.

According to yet a further aspect of the invention the first and second electro-acoustic sensors are arranged less than 4 dm from each other. An effect is that the device can be kept small and therefore easy to carry.

According to yet a further aspect of the invention the first and second electro-acoustic sensors are arranged in a range of 5 cm to 4 dm from each other. An effect is that the device can be kept small and therefore easy to carry at the same time as the accuracy of the measurement is high.

According to another aspect of the invention the first and second electro-acoustic sensors are located at opposite ends of the housing facing in the same direction. An advantage is that higher accuracy is achieved since almost the whole length of the device is used to provide a distance between the first and second electro-acoustic sensors.

According to yet another aspect of the invention the device is arranged to determine shock wave speeds from Mach 1 to Mach 10.

According to a further aspect of the invention the device further comprises a memory arranged to store the velocity of the bullet. An effect is that a more solid construction is achieved where the data of the velocity of bullets is stored in the device.

According to yet a further aspect of the invention the memory further is arranged to store target hit data of the bullet. An effect is that a more solid construction is achieved where target hit data of the bullets is stored in the device.

According to another aspect of the invention the velocity presentation means is a display. An effect is that a more solid construction is achieved where the velocity of the bullet is presented with a display at the device.

According to yet another aspect of the invention the velocity presentation means comprises a wireless transmission circuit arranged to transmit the velocity and/or target hit data to a remote receiver. An effect is that the velocity and/or target hit data can be transmitted to a receiver unit for further analysing of the data.

BRIEF DESCRIPTION OF FIGURES

The invention will be further described with reference to the accompanying drawings.

DETAILED DESCRIPTIONS OF INVENTION

As used herein, the term "acoustic energy" means either a pressure wave or shock wave generated by a bullet travelling at supersonic speed. The term "bullet" includes any recognized structure of the type capable of being launched or projected by a pistol or rifle firearm. The term "ultrasonic microphone" refers to any electro-acoustic sensor capable to detect acoustic energy in the ultrasonic range. The term "sensor" refers to an electro-acoustic sensor.

A bullet which travels with supersonic speed generates a detectable shock wave with a distinctive character. The shock wave or Mach-wave, is an expanding conical pressure-wave shock front set up by the bullet as it passes through the air. This shock wave is detected by the electro-acoustic sensors arranged to detect acoustic energy in the ultrasonic range, i.e. sound above the generally accepted audible frequency of 20 kHz. For this purpose ultrasonic microphones are used. These kinds of sensors are particularly well suited to provide accurate results because of their short rise time and quick response. In addition, ultrasonic microphones are by their own design effectively filtering ambient noise in the audible segment, such as the shot noise from a gun or similar.

Figure 1:
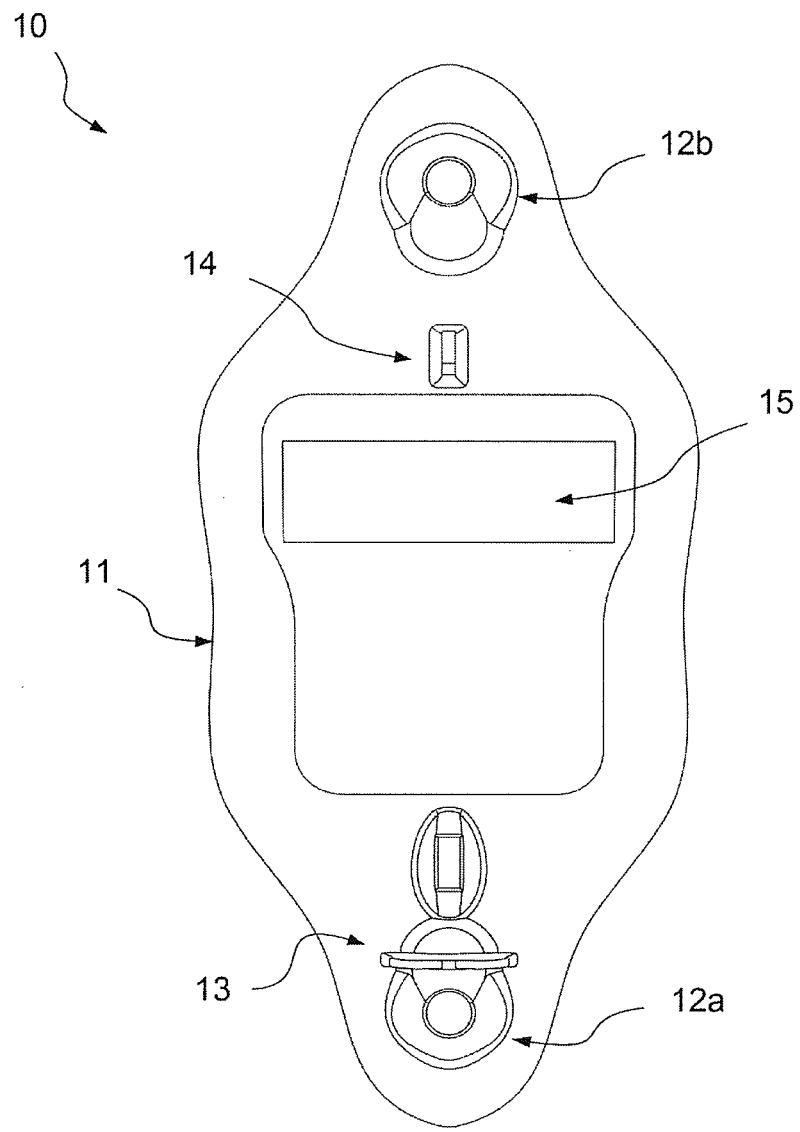
FIG. 1 shows a top view of the device according to an embodiment of the invention.
Figure 2:
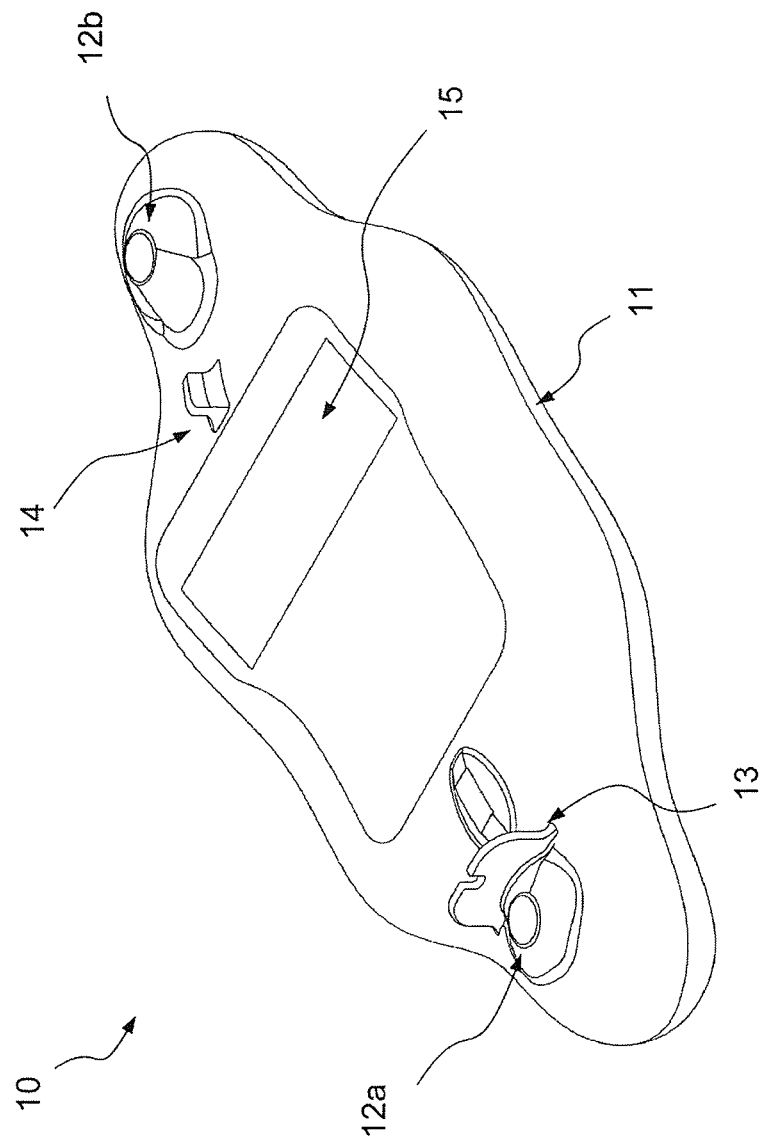
FIG. 2 shows a perspective view of the device according to an embodiment of the invention.

FIG. 1 shows a top view and FIG. 2 shows a perspective view of the device 10 for determining the velocity of a bullet travelling in a direction from a point of fire to a target according to an embodiment of the invention. The device 10 has a housing 11 which is water proof and protects the device 10. The device 10 comprises a first electro-acoustic sensor 12a and a second electro-acoustic sensor 12b capable to detect acoustic energy in the ultrasonic range arranged on the device 10. Sighting means is arranged on the device 10 for aligning the first and second electro-acoustic sensors 12a, 12b parallel to the direction from the point of fire to the target. A display 15 is arranged on the device 10. The display is suitable for presenting a measured bullet velocity. The device 10 further comprises a battery.

According to an embodiment of the invention the sighting means comprises a notch 13 as a back sight and a bead 14 as a front sight. According to another embodiment of the invention the sighting means comprises a reflector sight, a telescope sight or a red dot sight. According to a further embodiment the sighting means comprises a laser sight.

The device 10 is placed on the ground or on a stand at a position underneath a line between the point of fire and the target. In order to align the device 10 in the direction from the point of fire to the target the sighting means of the device 10 is aimed at the target.

According to an embodiment of the invention the device 10 further comprises a spirit level. An advantage is that the spirit level provides means to align the electro-acoustic sensors 12a, 12b in a horizontal position which further increases the accuracy of the measurements.

According to a further embodiment of the invention each of the first and second electro-acoustic sensors 12a, 12b is arranged at different sides of the 15 display aligned with the sighting means. Thus, it is easier to align the first and second electro-acoustic sensors 12a, 12b in the direction from the point of fire to the target which provides higher accuracy of the measurements. The first and second electro-acoustic sensors 12a, 12b are facing towards the line between the point of fire and the target, orthogonal to the direction from the point of fire to the target. The first and second electro-acoustic sensors 12a, 12b may be arranged at other positions on the device 10, as long as they are facing in a direction enabling detection of a passing shock wave.

By using only two sensors at a fixed distance from each other and sighting means to align the sensors with the bullet whose speed is to be measured, the device 10 provides measurements of high accuracy that previously has not been possible with such a simple structure.

According to a yet further embodiment of the invention the device further comprises at least a further electro-acoustic sensor which is arranged in a direction orthogonal to the alignment of the first and second electro-acoustic sensors. An effect is that it is easier to determine an angle of incidence of the bullet in relation with the electro-acoustic sensors in order to accomplish higher accuracy of the measurement. The device may also include at least a further electro-acoustic sensor aligned with the first and second electro-acoustic sensor. Such a further electro-acoustic sensor operates in analogy with the first and second electro-acoustic sensor and contributes to a higher accuracy in the measurements. An additional electro-acoustic sensor aligned with the first and second electro-acoustic sensor may contribute with back-up measurements if a measurement from the first or second electro-acoustic sensor is rejected during processing.

Figure 3:
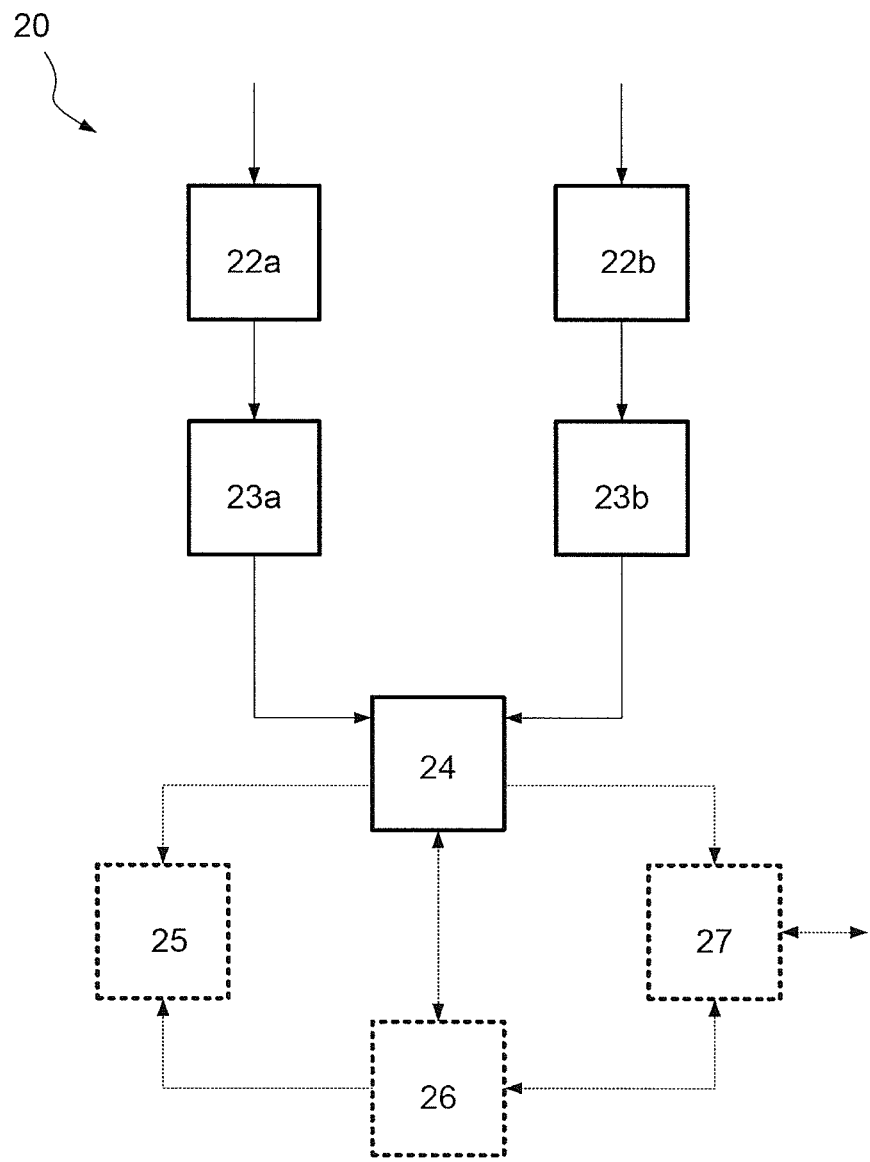
FIG. 3 shows a block diagram of an embodiment of the invention.

FIG. 3 shows a block diagram of an embodiment of the invention showing the important components in the device 10; 20. In a start up mode the second electro-acoustic sensor 12b; 22b is deactivated. When detecting acoustic energy in the ultrasonic range at the first electro-acoustic sensor 12a; 22a the acoustic energy in the ultrasonic range is transduced into a first electrical signal by the first electro-acoustic sensor 12a; 22a. The first electrical signal is thereafter amplified by means of a first amplifier circuit 23a which comprises an operational amplifier with a high sampling rate. The first electrical signal is then sent directly to a processing unit 24 operating with a high frequency to provide a precise measurement of the time of arrival of the first electrical signal. The first electro-acoustic sensor 12a; 22a is then deactivated and the second electro-acoustic sensor 12b; 22b is activated. When detecting acoustic energy in the ultrasonic range at the second electro-acoustic sensor 12b; 22b the acoustic energy in the ultrasonic range is transduced into a second electrical signal by the second electro-acoustic sensor 12b; 22b. The second electrical signal is thereafter amplified by means of a second amplifier circuit 23b which comprises an operational amplifier with a high sampling rate. The second electrical signal is then sent directly to the processing unit 24 operating with a high frequency to provide a precise measurement of the time of arrival of the second electrical signal. The second electro-acoustic sensor 12b; 22b is then deactivated and the first electro-acoustic sensor 12a; 22a is activated. The processing unit 24 determines a time frame between the time of arrivals of the first and second electrical signals. By the known distance between the sensors and the known time frame between the time of arrival of the first and second electrical signals a velocity of the bullet can be determined with high accuracy. The velocity of the bullet is presented by a display 15; 25.

According to one embodiment of the invention, a memory 26 is included in the device 10; 20 and is arranged to store the velocity of the bullet and/or target hit data of the bullet. According to another embodiment a transceiver 27 is included in the device 10; 20 and is arranged to receive target hit data of the bullet from the memory 26. The transceiver is further arranged to transmit the velocity and/or target hit data to a remote receiver.

According to an embodiment of the invention the display 15; 25 is arranged to provide a battery level indicator. According to a further embodiment of the invention the device is capable of saving several velocity measurements in a shot string in the memory 26. The display 15; 25 comprises means for switching between velocity measurements in the shot string. The display 15; 25 further comprises means for displaying an average velocity of shots the shot string. The display 15; 25 further comprises means for clearing the memory 26. The display 15; 25 also comprises means for displaying the velocity measurements in m/s or ft/s. Further the display 15; 25 comprises means for turning on/off the device.

The invention is not limited to the specific drawings presented, but includes all variations within the scope of the present claims.

As will be realised, the invention is capable of modification in various obvious respects, all without departing from the scope of the appended claims. Accordingly, the drawings and the description thereto are to be regarded as illustrative in nature, and not restrictive.

What is claimed is:

1. A hand portable device for determining velocity of a bullet travelling in a direction from a point of fire to a target, comprising:
    a housing encompassing first and second electro-acoustic sensors arranged at a predetermined distance from each other and aligned along a first direction;
    a processor configured to receive a first electrical signal from the first electro-acoustic sensor and a second electrical signal from the second electro-acoustic sensor, to determine a time frame between the reception of the first and second electrical signals, and to determine the velocity of the bullet in a direction parallel to the alignment of the first and second electro-acoustic sensors;
    a velocity presentation unit configured to present the determined velocity of the bullet in a direction parallel to the alignment of the first and second electro-acoustic sensors; and
    a sight unit comprising a notch and a bead attached to the housing along a direction parallel to the first direction of electro-acoustic sensor alignment,
    wherein the first and second electro-acoustic sensors are shock wave detectors arranged to detect acoustic energy of a shock wave in a range of Mach 1 to Mach 10 generated by the bullet when travelling at supersonic speed in the direction from the point of fire to the target and to transduce the acoustic energy in the ultrasonic range into an electrical signal.

2. Device according to claim 1, wherein the first and second electro-acoustic sensors are alternatingly activated and deactivated, such that before detecting acoustic energy in the ultrasonic range the first electro-acoustic sensor is activated and after detecting acoustic energy in the ultrasonic range at the first electro-acoustic sensor only the second electro-acoustic sensor is activated.

3. Device according to claim 1, further comprising at least a further electro-acoustic sensor arranged in alignment with the first and second electro-acoustic sensors.

4. Device according to claim 1, further comprising at least a further electro-acoustic sensor which is arranged in a direction orthogonal to the alignment of the first and second electro-acoustic sensors.

5. Device according to claim 1, wherein the first and second electro-acoustic sensors are arranged to detect ultrasound in the range of 20 kHz to 20 MHz.

6. Device according to claim 1, wherein the first and second electro-acoustic sensors have a response time shorter than 5 μs.

7. Device according to claim 1, wherein the first and second electro-acoustic sensors are arranged less than 4 dm from each other.

8. Device according to claim 1, wherein the first and second electro-acoustic sensors are arranged in a range of 5 cm to 4 dm from each other.

9. Device according to claim 1, wherein the first and second electro-acoustic sensors are located at opposite ends of the housing facing in the same direction.

10. Device according to claim 1, further comprising a memory arranged to store the velocity of the bullet.

11. Device according to claim 10, wherein the memory further is arranged to store target hit data of the bullet.

12. Device according to claim 1, wherein the velocity presentation unit is a display.

13. Device according to claim 1, wherein the velocity presentation unit comprises a transceiver is arranged to transmit the velocity and/or target hit data to a remote receiver.

14. Device according to claim 1, wherein the notch and the bead are protruding from a surface of the housing,
    wherein when viewed from over the surface, the notch, the bead, the velocity presentation unit are located between the first and second electro-acoustic sensors such that the first electro-acoustic sensor, the notch, the velocity presentation unit, the bead, and the second electro-acoustic sensor are arranged in order and aligned along the first direction of electro-acoustic sensor alignment.

15. Device according to claim 1, wherein the device further comprises a spirit level attached to the housing for aligning the first and second electrode-acoustic sensors in a horizontal position.

* * * * *